A. A. BAILEY, Jr.
AUTOMATIC PICTURE PROJECTING APPARATUS.
APPLICATION FILED DEC. 9, 1916.
1,325,825.
Patented Dec. 23, 1919.
2 SHEETS—SHEET 1.
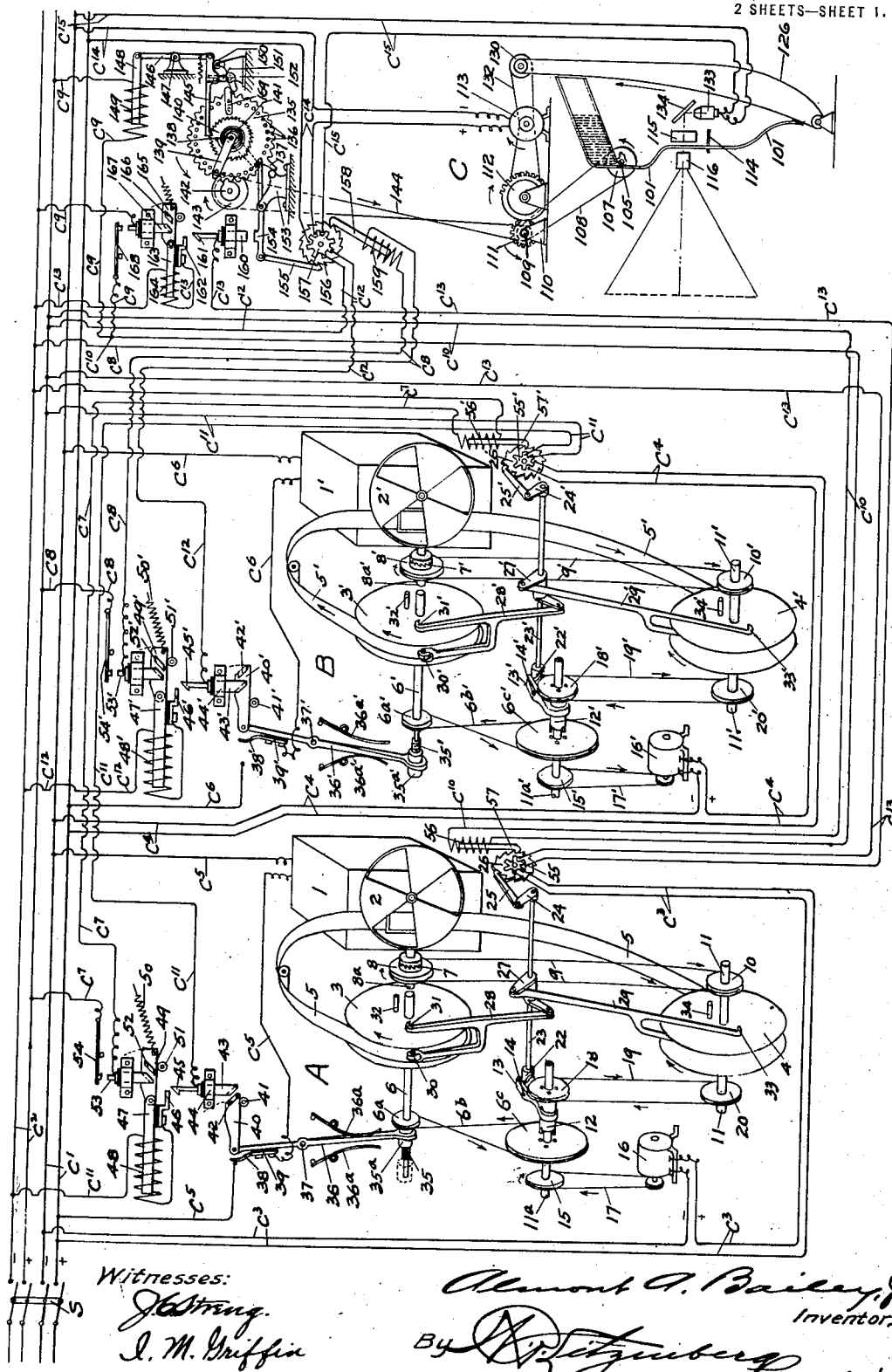
Fig. 1.
Witnesses:
Inventor.
Atty.

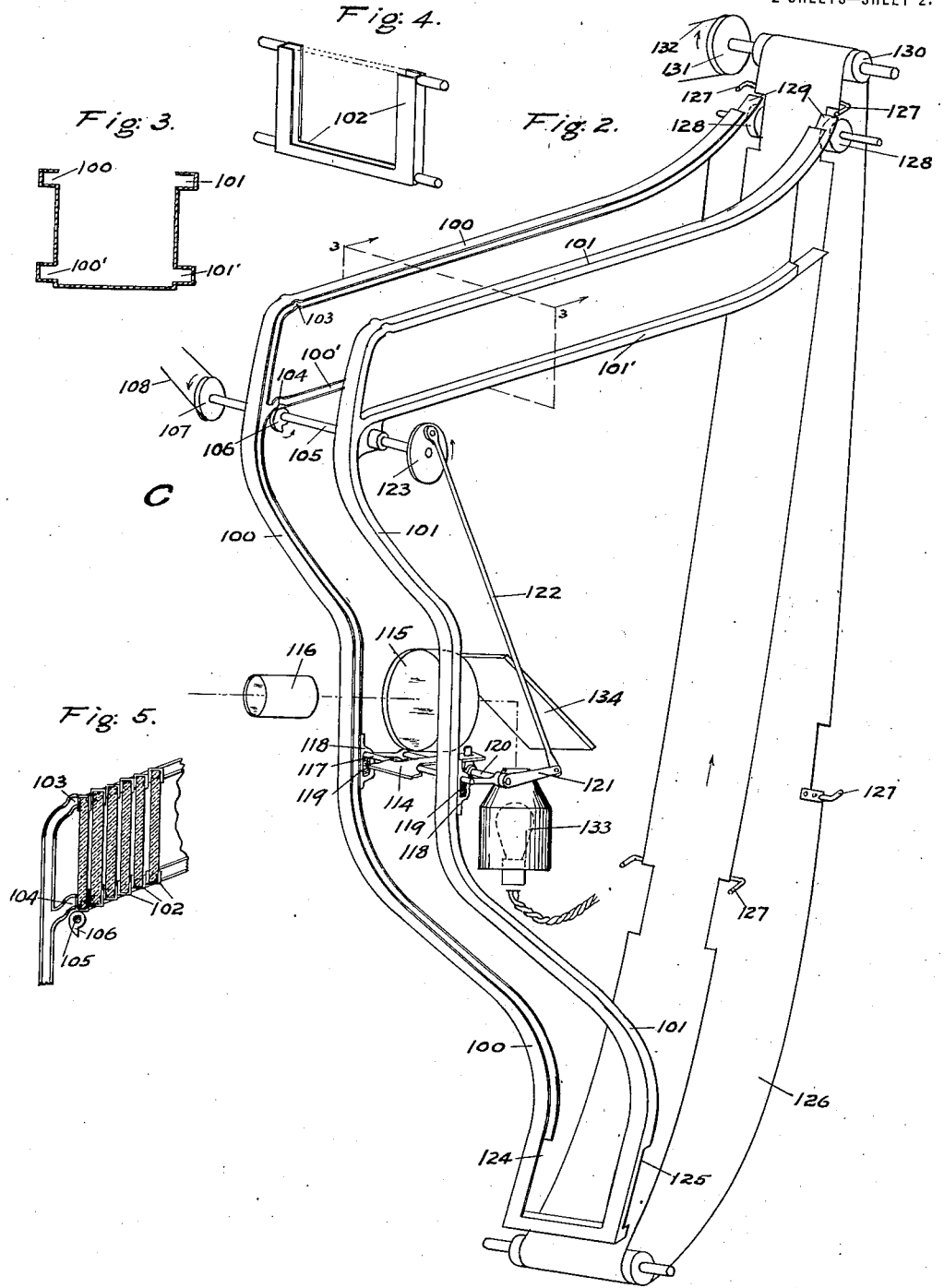

UNITED STATES PATENT OFFICE.

ALMONT A. BAILEY, JR., OF PORTLAND, OREGON.

AUTOMATIC PICTURE-PROJECTING APPARATUS.

1,325,825.     Specification of Letters Patent.     Patented Dec. 23, 1919.

Application filed December 9, 1916. Serial No. 136,076.

*To all whom it may concern:*

Be it known that I, ALMONT A. BAILEY, Jr., a citizen of the United States, residing in the city of Portland, county of Multnomah, and State of Oregon, have invented certain new and useful Improvements in Automatic Picture-Projecting Apparatus, of which the following is a specification.

My invention relates to automatic picture projecting apparatus, and has for its principal object to provide, in combination, a plurality of picture projecting devices, including both moving picture and stationary picture devices, with connections therebetween, whereby, when one of said picture projecting machines has shown its pictures, it will automatically start another picture-projecting machine, which in turn, after it has shown its pictures, will automatically start a third picture-projecting machine, which third picture-projecting machine, after it has shown its pictures, will operate to automatically again start the first picture machine. Thus, by means of my invention, I am able to couple up a plurality of picture-projecting machines in such a way that they are operated automatically and successively, so long as the main switch remains closed. Another object of the invention is to provide in connection therewith, means for automatically rewinding the films after they have been run through either of the moving picture machines, and to automatically do this on one machine while another machine is showing its pictures. Another object of my invention is to provide means whereby, if the film on one machine has not been fully rewound, and the machine again made ready for operation, it cannot be started until its film has been fully rewound. Another object is to include in the combination, mechanism for automatically showing stationary pictures, as by means of lantern slides, with means for automatically handling the slides and carrying them through a circuitous course of travel, and with means of control whereby, after a predetermined number of such slides have been shown, this mechanism is automatically stopped and one of the moving picture-projecting machines is again started.

In order that others may understand my invention I have illustrated one practical embodiment thereof in the accompanying two sheets of drawings, which I will now describe.

Figure 1 is a diagrammatic view illustrating, in combination, two moving picture machines, and one picture slide machine, with the necessary electrical and mechanical connections for automatically and successively operating said picture-projecting machines;

Fig. 2 is an enlarged perspective view illustrating mechanism for holding and automatically feeding picture slides through a circuitous course of travel, in which they are momentarily stopped at a projecting apparatus by which they are thrown on to the screen;

Fig. 3 is a cross sectional view taken on the line 3—3 of Fig. 2;

Fig. 4 is a perspective view of a picture slide septum, or holding and carrying frame; and Fig. 5 is a fragmentary vertical sectional view through a series of picture slides and the carrying and feeding frame.

Referring now more in detail to the drawings, I will describe the diagrammatic embodiment of my invention, here shown for purposes of illustration. I have designated the moving picture apparatus to the left of Sheet 1 of the drawings as A, and the moving picture apparatus shown in the middle of the sheet as B, and the picture slide apparatus at the right of the sheet as C. Inasmuch as the picture projecting apparatuses A and B are the same, I will use the same reference numerals with the prime mark for corresponding parts of apparatus B.

In the drawings 1 and 1′ designate the respective lamp houses and projecting devices of apparatuses A and B; and 2 and 2′ the respective revolving shutters. 3 and 3′, and 4 and 4′, designate the film spools, and 5 and 5′ the films. The film spools 3 and 3′ are mounted upon shafts 6 and 6′, provided, respectively, with driving pulleys $6^a$ and $6^{a\prime}$, adapted to be driven for rewinding purposes by means of belts $6^b$ and $6^{b\prime}$, from large pulleys $6^c$ and $6^{c\prime}$. The large pulleys $6^c$ and $6^{c\prime}$, are mounted loosely upon shafts $11^a$ and $11^{a'}$, and are adapted to be automatically locked to said shafts by means of clutches 12 and 12′, slidably secured on said shafts $11^a$ and $11^{a'}$, and shifted by means of clutch levers 13 and 13′, fulcrumed at 14 and 14′. Also mounted on the shafts $11^a$ and $11^{a'}$, are driving pulleys 15 and 15′, driven, respectively, from motors 16 and 16′, by means of belts, or cables, 17 and 17′. Also loosely mounted on said shafts $11^a$ and $11^{a'}$ are pulleys 18 and 18′, from which are driving cables, or belts, 19 and 19′, running to pulleys 20 and 20′, on the shafts 11 and 11′, on which shafts are mounted, respectively, the film spools 4 and 4′. When the clutch levers 13 and 13′ are in the positions shown, the pulleys 18 and 18′, are secured to the shafts $11^a$ and $11^{a'}$, so as to turn therewith for driving the film spools 4 and 4′, on the shafts 11 and 11′. The shafts 11 and 11′ are also provided with pulleys 10 and 10′, from which run belts, designated, respectively, 9 and 9′, to pulleys 8 and 8′, on short shafts $8^a$ and $8^{a'}$, mounted in substantial alinement with the shafts 6 and 6′, and connected in any desired manner for driving the shutters 2 and 2′, and the film advancing mechanisms (not shown). Said short shafts $8^a$ and $8^{a'}$, are provided with pulleys 8 and 8′, and may also be provided with clutch mechanisms, 7 and 7′, between the pulleys 8 and 8′, and the connections for driving the shutters, and the film advancing mechanism.

When the clutch levers 13 and 13′ are moved, in a manner hereinafter described, the pulleys $6^c$ and $6^{c'}$ are locked to the shafts $11^a$ and $11^{a'}$, and the pulleys 18 and 18′, are allowed to run free. It will be noticed that the belts $6^b$ and $6^{b'}$ are crossed so that when the clutch members 13 and 13′, are moved to lock the pulleys $6^c$ and $6^{c'}$, to the shafts $11^a$ and $11^{a'}$, driven from the motors 16 and 16′, the shafts 6 and 6′, are driven in a reverse direction for the purpose of rewinding the films 5 and 5′, respectively, upon the film spools 3 and 3′. This rewinding is accomplished at a much greater speed because of the differences in the sizes of the pulleys $6^c$ and $6^{c'}$, and the pulleys $6^a$ and $6^{a'}$. The films 5 and 5′, are drawn by the film spools 3 and 3′, through the film advancing mechanism, which, with the shutters 2 and 2′, and the pulleys 8 and 8′, are free to run loosely, in connection with the film spools 4 and 4′, which are being turned by reason of the fact that the films are being drawn therefrom.

Said clutch levers 13 and 13′ are moved, respectively, by means of worm cams 22 and 22′, mounted upon shafts 23 and 23′, the opposite ends of which shafts 23 and 23′, are provided with crank arms 24 and 24′, connected by means of pawls 25 and 25′, to ratchet wheels 26 and 26′. Also mounted upon the shafts 23 and 23′, are double bell crank members 27 and 27′, the corresponding arms of which are connected, respectively, with forks 28 and 28′, and 29 and 29′. One prong of each of the forks 28 and 28′, is provided with a roller as 30 and 30′, adapted to roll, respectively, upon the films 5 and 5′, between the sides of the film-spools 3 and 3′, while the other prongs of said forks 28 and 28′, are provided with hooks 31 and 31′, adapted when said forks 28 and 28′ have moved inwardly toward the shafts 6 and 6′, by reason of the unwinding of the films 5 and 5′, to catch momentarily upon the pins 32 and 32′, in the sides of the film-spools 3 and 3′, thus operating to rock the shafts 23 and 23′, a partial turn, but sufficient to operate the clutch levers 13 and 13′, through the worm cams 22 and 22′. The corresponding prongs of the forks 29 and 29′ ride upon the films 5 and 5′, as the same are wound upon the film-spools 4 and 4′, or are unwound therefrom. The other prongs of the forks 29 and 29′, are provided with hooks 33 and 33′, adapted to catch upon the pins 34 and 34′, when said forks have moved sufficiently close to the shafts 11 and 11′, thus operating to rock the shafts 23 and 23′, and reverse the movements of the clutch levers 13 and 13′. It will be seen that when the clutch levers 13 and 13′, are in the positions shown, the pulleys 18 and 18′, are driven and drive the film spools 4 and 4′, so as to wind the films 5 and 5′ thereupon, the film spools 3 and 3′, running loose with the shafts 6 and 6′, since they are connected direct to free pulleys $6^c$ and $6^{c'}$. When the clutch levers 13 and 13′ have been moved through the rocking of the shafts 23 and 23′, and so as to lock pulleys $6^c$ and $6^{c'}$, to the shafts $11^a$ and $11^{a'}$, the film spools 3 and 3′ are positively driven in a rewinding direction, drawing the films 5 and 5′ from the spools 4 and 4′.

The shafts 6 and 6′ are provided, respectively, on their outer ends with short screw thread sections 35 and 35′, upon which are mounted sleeves $35^a$ and $35^{a'}$, held against turning by reason of their attachment to rocker levers 36 and 36′, pivotally mounted, as at 37 and 37′. The lower ends of said levers 36 and 36′ are initially moved so as to start the threaded sleeves $35^a$ and $35^{a'}$ on to the short threaded sections 35 and 35′, of the shafts 6 and 6′, by means of springs $36^a$ and $36^{a'}$. Said sleeves $35^a$ and $35^{a'}$ are simply transferred on said shafts 6 and 6′ from one end of said threaded sections to the opposite side thereof for the purpose of rocking said pivoted rocker levers 36 and 36′. The upper ends of said levers are provided with electrical contact members 38 and 38′, insulated therefrom at 39 and 39′. Pivotally connected to the upper ends of said levers 36 and 36′ are cam blocks 40 and 40′, adapted to move upon rollers 41 and 41', and provided on their outer ends with inclined cam lugs 42 and 42', adapted to engage the lower ends of vertical contact bars 43 and 43', sliding in brackets 44 and 44', from which they are insulated, as indicated, said vertical contact bars 43 and 43', being adapted to be raised by the cam blocks 40 and 40', as said cam blocks are moved to the right, in a manner which will be clearly understood from the drawings. The cam blocks 40 and 40', being free at their outer ends, are lifted over the inclined lug portions of the vertical contact bars 43 and 43', as they move back toward the left from the position shown in apparatus B, to the position shown in apparatus A. When the vertical contact bars 43 and 43' have been raised through the movement of the rocker levers 36 and 36', and the cam blocks 40 and 40', their upper, hooked ends 45 and 45', catch upon projecting lips 46 and 46', mounted upon and moving with the armature bars 47 and 47', of the solenoids 48 and 48'. Pivotally connected to the outer ends of the armature bars 47 and 47', are cam blocks 49 and 49', normally drawn outwardly by springs 50 and 50'. Said cam blocks 49 and 49', are supported by, and move loosely upon, rollers 51 and 51', and are provided on their sides with inclined cam lugs 52 and 52', adapted to engage the lower ends of vertical electrical contact bars 53 and 53', in a manner in which to raise them sufficiently to make a momentary contact with electrical contact members 54 and 54', the vertical electrical contact bars 53 and 53' dropping back into their normal position immediately after the momentary contact with members 54 and 54', which momentary contact imparts an electrical impulse of short duration to the respective solenoids 56' of apparatus B and 159 of apparatus C, as will be clear from the drawings.

The ratchet wheels 26 and 26', are provided on their outer faces with commutators 55 and 55'. Said ratchet wheels 26 and 26' are adapted to be stepped forward by means of solenoids 56 and 56', having armatures provided with hooks 57 and 57', adapted to engage with the teeth of said ratchet wheels 26 and 26', and also adapted to be moved similarly by hooked pawls 25 and 25' during counterclockwise movements of shafts 23 and 23'.

I will next describe the lantern slide apparatus in which lantern slides are supported in quantity and fed one by one to a projecting apparatus used in connection therewith. A supporting and slideway frame, composed of the spaced channel members 100 and 101, is adapted to receive therein lantern slide septums or carrying frames 102, Fig. 4, the four corner pins of said frame fitting and sliding within the inwardly facing channels of the members 100 and 101, said members at their upper ends, each being composed of two parts, 100—100' and 101—101', forming altogether four channels, as clearly illustrated in the sectional view, Fig. 3. The picture slides are detachably placed within the carrier frames 102, as indicated in dotted lines, Fig. 4. At the juncture of the double portions of the supporting frames, said channels are provided with hump-like portions 103 and 104, Figs. 2 and 5. Mounted directly underneath is a cross shaft 105, provided with lifting members 106, adapted to revolve therewith and to engage the lower edge of a picture frame, at its opposite ends, and to lift it into and through the humped portions 103 and 104, formed in the frame channels, as will be clear from Figs. 2 and 5. Said shaft 105, is provided with a pulley 107, by which it is driven through a belt 108, Fig. 1, running over a pulley upon a shaft 109, mounted in suitable standards 110, and also provided with an intermittent gear 111, adapted to be driven by an intermittent gear 112, driven from a motor 113. Thus the carrier frames 102, are intermittently lifted by the members 106, on the shaft 105, and are allowed to drop down through the channel frame until they stop upon a movable support 114, Fig. 2, mounted in position to support the picture carrier frame between the lenses 115 and 116, of a projecting apparatus. The movable support 114, rests upon a cross bar 117, the opposite ends of which are yieldingly supported in brackets 118, in which are mounted coiled springs 119, which act as a shock absorber when catching the picture carriers 102, as they slide down the frame, between the channel members 100 and 101. At its opposite end, said support 114, is connected with a rocker bar 120, provided at its outer end with a rocker arm 121, connected by means of a pitman 122, to a crank wheel 123, upon the opposite end of the shaft 105, which operates, through its members 106, to release the picture carrier frames 102, at the upper end of the main frame. Thus as a picture frame is lifted by the shaft 105, into the slideway to move downwardly into position to be shown, on the support 114, said support 114, is moved through the pitman 122, to drop the picture frame thereon, which has been exhibited. As said picture frame is dropped from the support 114, it slides downwardly into the lower ends of the frame members 100 and 101, where the channels of said frame members are opened out through one side, as at 124 and 125, so as to allow said frame member to drop outwardly at its top on to a traveling conveyer belt 126, provided at intervals with carrying forks 127, adapted to catch the projecting pins from the upper corners of the picture frames, and thus to carry said picture frames upwardly to the upper end of the main frame, where a pair of rollers 128—128, operate to push them off of the hooks 127, and on to the extended portions 129, of the main frame, as clearly illustrated in Fig. 2 of the drawings. Said conveyer belt 126, is driven at its upper end by means of a roller 130, provided with a driving pulley 131, to which runs a belt 132, from the motor 113, as shown in Fig. 1.

Thus it will be understood that any number of picture frame carriers, as 102, may be placed in the upper portion of the main supporting and guide frame, and that these picture frames will be fed one at a time, at suitable intervals apart, into position to be projected by the lenses 115 and 116, and will then be released and allowed to drop down into a position to be picked up by the conveyer 126, and carried again to the upper end of the main picture frame. The source of light is indicated at 133, and is directed through the lenses by means of a reflector 134.

I will next describe the mechanism by means of which a predetermined number of lantern slides may be moved to the projecting apparatus adapted therefor, together with the circuit connections controlled thereby. Referring to the upper right hand corner of Sheet 1, of the drawings, 135 designates a special wheel provided with teeth around its outer periphery and with pin holes 136, around near its edge, said pin holes being numbered from 1 upwardly, commencing at an extended tooth 137, which operates as a stop. Mounted upon the same axle, or shaft, 138, with said wheel 135, is a lever 139, adapted at its outer end to be set in any one of the desired pin holes around the edge of said wheel 135, it being shown as set in the 7th hole from the extended tooth 137. Also mounted on the same shaft 138, and secured to the wheel 135, is a ratchet wheel 140, and a coiled spring 141, one end of which is secured to the shaft and the other end of which is secured to the ratchet wheel. Mounted near the wheel 135, is a single toothed wheel 142, adapted to be driven by a pulley 143, which is driven by means of a belt 144, from the intermittent gear 111 below. This single toothed gear 142, operates to turn the large wheel 135, forward one notch at each revolution. A ratchet pawl 145, normally in engagement with the ratchet 140, is attached at its outer end to a rocker lever 146, pivoted at 147, and attached at its upper end to the armature 148, of a solenoid 149. As said rocker lever 146, is rocked by the energizing of said solenoid, which draws its armature inwardly, said ratchet pawl 145, is drawn outwardly and it is also raised by reason of the roller bearing 150, and the pivoted bell crank 151, on the bearing block 152, said ratchet pawl 145, having a fork and pin support, or connection, intermediate its ends, with the upper end of the bell crank 151, whereby said pawl 145, can not only be moved backwardly, but can be lifted out of engagement with the ratchet wheel 140. Pivotally mounted upon another bearing standard 153, is a lever 154, adapted at its inner end to be engaged by the end of the lever 139, as it is turned downwardly, with the wheel 135, to the position indicated for it in dotted lines. The outer end of said lever 154, has pivoted thereto a pawl 155, adapted to turn a ratchet wheel 156, provided on its face with a commutator 157. Said ratchet 156, may also be turned by means of the armature 158, of a solenoid 159, when the latter is energized. When the lever 154 has been rocked, its outer end is raised sufficiently to lift a vertical plunger 160, so that the upper hooked end 161 thereof, hooks onto a lip 162, carried by an armature 163, of a solenoid 164. Pivotally attached to the outer end of the armature 163, is a cam block 165, provided with a cam lug 166, adapted to engage the lower end of a vertical contact plunger 167, and lift the same until it engages at its upper end with a contact member 168. The wheel 135, is also provided on its face with a finger 169, adapted to engage and rock the bell crank 151, as hereinafter again referred to, to move the ratchet pawl 145, back into holding engagement with ratchet wheel 140.

As the motor 113, drives the intermittent gear 112, the gear 111, is given one intermittent turn with each revolution of the gear 112. This operates through the pulley 107, on the shaft 105, to lift a picture frame carrier into position to drop down before the projecting apparatus. It also operates to turn the single toothed gear 142, one turn, stepping forward the wheel 135 one notch.

If seven lantern slides are to be shown, the lever 139 has been set in the wheel 135 at the pin hole numbered 7. By the time seven lantern slides have been intermittently projected, the arm, or lever, 139, has been turned down to the position shown in dotted lines, rocking the lever 154, so as to raise its outer end, which turns the ratchet commutator 156, one notch, and also lifts the vertical contact plunger 160, into hooked engagement with the lip 162.

I will now describe the various circuits and their connections to the various electrically-operated parts of the mechanisms. $C^1$ designates two main lines of a circuit which are connected to the motors and to the lamps. $C^2$ designates the two main lines of a circuit to which the solenoids only are connected. S designates a main switch, whereby both the main circuits $C^1$ and $C^2$ are connected to a source of electric energy. A circuit $C^3$, runs from the main circuit $C^1$, to the motor 16, and to the commutator 55, and back. A similar circuit C⁴, runs from the main circuit C¹, to the motor 16′, and to the commutator 55′ and back. A circuit C⁵, runs from the main line C¹, through the contact member 38, on the lever 36, and to the lamp house 1, and back to the main line C¹. A similar circuit C⁶, runs from the main line C¹, to the contact member 38′ (shown open), to the lamp house 1′, and back to the main line C¹. A circuit C⁷, runs from the main circuit line C², through the contact members 53 and 54, to the solenoid 56′, and back to the main line C². A corresponding circuit C⁸, runs from the main line C², through contact members 53′ and 54′, to solenoid 159, and back to the main lines C². A circuit C⁹, runs from the main lines C², through the contacts 167 and 168, to the solenoid 149, and back to the main line C². Said circuit C⁹ also divides at the point C¹⁰, and runs as circuit C¹⁰, to the solenoid 56, and back to the main line C².

Referring now to the upper left hand corner of Fig. 1, a circuit C¹¹, runs from the main line C², through the solenoid 48, and the lip 46, the contact member 45, thence over and down to the commutator 55′, and back to the main line C². A similar circuit C¹², starts from the main line C², and runs through the solenoid 48′, the contact lip 46′, the contact member 45′, thence over to the commutator 157, in the apparatus C, and thence to the main line C². A circuit C¹³, runs from the main line C², through the solenoid 164, through the contact lip 162, contact member 161, thence downwardly and around to the left and up through the left commutator 55, and back up to the main line C². Referring to the upper right hand corner of Fig. 1, a circuit C¹⁴, extends from the main line C¹, down to the commutator 157, thence down to the motor 113, thence back to the main line C¹. A circuit C¹⁵, also extends from the main line C¹, down to the lamp 133, and thence back up to the commutator 157, through which it can be connected back to the main line, when said commutator is turned, through one line of the circuit C¹⁴.

I will now describe the operation of my invention as here illustrated.

Assuming that the parts are set as shown in Fig. 1 of the drawings, if the main switch S be closed, circuit C³, to the motor 16 and to the commutator 55, will be closed, and the motor will be started, driving the film spool 4, through the parts 17, 15, 11ᵃ, 18, 19, 20 and 11, in the direction indicated by the arrow, and drawing the film 5, from the spool 3, to the spool 4, through the lantern housing 1, said film being also moved by the usual mechanism, not shown, adapted to be driven by shaft 8ᵃ, pulley 8, and belt 9, from the driving pulley 10 on shaft 11. Circuit C⁵, through the contact 38, to the lantern housing 1, will also be closed at the same time, thus furnishing a source of light for projecting the pictures. This machine will continue to run until the film 5, has been almost unwound from spool 3 onto spool 4, and the fork 28, bearing on the film on spool 3, has moved inwardly until its hook 31, catches momentarily on the pin 32, on said spool 3, and rocks the shaft 23, which operates the clutch lever 13, and moves the clutch 12, into position to lock the large pulley 6ᶜ, to the shaft 11ᵃ. This releases the pulley 18, on said shaft 11ᵃ, and through the crossed belt 6ᵇ, and the pulley 6ᵃ, on the shaft 6, reverses the direction of rotation of said shaft 6, and the film spool 3, so as to rewind the film 5, onto the spool 3. At the same time, the sleeve 35ᵃ, is transferred over the short threaded portion 35, of shaft 6, moving the lower end of the lever 36, to the left, and the upper end of said lever to the right, thus breaking the contact in circuit C⁵, at the contact member 38, and discontinuing the light in the housing 1, during the time the film 5, is being rewound from spool 4, to spool 3.

The movement of the upper end of the lever 36, to the right causes the cam block 40, to engage and lift the vertical contact bar 43, until its hook 45, catches on the lip 46, thus establishing a circuit C¹¹ through the solenoid 48, and over and through the commutator 55′, as shown in apparatus B. The energizing of the solenoid 48, draws its armature bar 47, which again releases the vertical contact bar 43, and through its cam lug 52, lifts the vertical contact bar 53, into momentary contact with the member 54, long enough to send an electric impulse through circuit C⁷ to the solenoid 56′, of apparatus B, whose armature is attracted sufficiently to turn the ratchet wheel 26′, which operates to open the circuit C¹¹, at the commutator 55′. The turning of the ratchet wheel 26′ and the commutator 55′, in addition to opening the circuit C¹¹, closes circuit C⁴, from the main circuit C¹, to the motor 16′, thus starting apparatus B by driving the shaft 11ᵃ′, pulleys 18′ and 20′, shaft 11′, film spool 4′, and through the pulley 10′, and the belt 9′ drives the pulley 8′ on the short shaft 8ᵃ′, which drives the film transfer mechanism and the shutter 2′, thus running the film 5′ from film spool 3′ to film spool 4′. As the film is drawn from the spool 3′ it turns its shaft 6′, which operates through the short threaded section 35′, and the sleeve 35ᵃ′, to move the lever 36′, so as to establish a circuit C⁶, through the contact member 38′, on the upper end of said lever 36′, to the lamp housing 1′, thus furnishing a source of light for projecting the pictures on film 5′, as it is run through the machine.

This apparatus B continues to run until the fork 28′, moves inwardly sufficiently, as the film 5′ is unwound from spool 3′, until its hook 31′ catches momentarily on the pin 32′ on the side of the spool 3′, rocking shaft 23′ so as to shift the clutch 12′ to release pulley 18′ from the shaft 11ᵃ′ and to lock the large pulley 6ᶜ′ to said shaft 11ᵃ′. This action immediately reverses the direction of the shaft 6′, and shifts the lever 36′ again to the position shown in said apparatus B, and breaks the circuit $C^6$ through the contact member 38′, thus discontinuing the light in the lamp housing 1′, and at the same time starts rewinding the film 5′ onto the spool 3′, from the spool 4′. The movement of the lever 36′ to the position shown in apparatus B, moves the vertical contact member 43′ upwardly until its hook 45′ catches on the lip 46′ on the armature 47′, thus establishing the circuit $C^{12}$ through the solenoid 48′, and the commutator 157 of the apparatus C. The energizing of the solenoid 48′ moves its armature 47′ and again releases the vertical contact member 43′, but has lifted the vertical contact member 53′ until it momentarily contacts with contact member 54′, establishing a circuit $C^8$, to the solenoid 159, of apparatus C just long enough to energize it and draw its armature 158, for turning the ratchet wheel 156, of apparatus C, one notch. This also turns the commutator 157, so as to open circuit $C^{12}$, at said commutator, which circuit has also been opened by the release of the hook 45′, from the lip 46′ just described.

The turning of the ratchet wheel 156 one notch, with its commutator 157, establishes through said commutator circuits $C^{14}$ and $C^{15}$. Circuit $C^{14}$ starts the motor 113, which operates the lantern slide apparatus C, as hereinbefore described, circuit $C^{15}$ furnishing the light to the lamp 133, as will be clear from the right hand side of Fig. 1 of the drawings. As this apparatus is operated the wheel 135, shown in the upper right hand corner of Sheet 1, is intermittently turned one notch at a time through the connecting belt 144, and the one-tooth gear 142, the latter being turned one notch each time a picture frame is dropped into position between the lenses 115 and 116 to be projected onto the screen. As soon as seven pictures, or lantern slides, have been shown, this being the number at which the lever 139 is set on the wheel 135, said lever 139 engages the rocker lever 154, as shown in dotted lines, and moves it so as to turn the ratchet wheel 156 and the commutator 157, one step and open circuits $C^{14}$ and $C^{15}$, which stop the motor 113 and cut off the light 133, and again closes circuit $C^{12}$ at the commutator, although this circuit $C^{12}$ is still open between the hook 45′ and the lip 46′. As the rocker lever 154 is moved by the lever 139 on the wheel 135, it engages and lifts the vertical contact member 160 until its hook 161, catches on the lip 162, carried by the armature 163 of the solenoid 164, establishing a circuit $C^{13}$, through said solenoid 164, and commutator 55 of appartus A, which draws its armature 163, inwardly, and lifts vertical contact member 167 until it engages contact member 168, sufficiently to establish circuits $C^9$ and $C^{10}$, long enough to send an impulse through circuit $C^9$, to the solenoid 149, which draws its armature 148 inwardly, rocks the lever 146, so as to release the ratchet lever 145, whereby the spring 141, operates to turn the wheel 135, back to its normal position at which the finger 169 engages the rocker lever 151, and again moves the ratchet lever 145, into engagement with the ratchet 140, the solenoid 149 having been only momentarily energized. The circuit $C^{10}$, which is also only momentarily closed, carries an impulse to the solenoid 56 of apparatus A, which draws its armature 57 and turns the ratchet 26 and the commutator 55, so as to again establish the circuit $C^3$, through said commutator 55, which starts the motor 16, and again starts apparatus A, which continues to show its pictures in the manner before described.

It will be understood that as soon as apparatus A has finished rewinding its film 5, from the film spool 4 to the film spool 3, the hook 33, on one prong of the fork 29, will momentarily be engaged by the pin 34, on the film spool 4, and will operate, through the fork 29, to rock the shaft 23, which will turn the ratchet wheel 26, and the commutator 55, by means of the pawl 25, thus opening circuit $C^3$, at the commutator 55, which stops the motor 16. The turning of the commutator 55, closes the circuit $C^{13}$, which runs to the solenoid 164. This rocking of the shaft 23, also shifts the clutch lever 13, and again locks the pulley 18 to the shaft 11ᵃ, and releases the large winding pulley 6ᶜ.

Assuming that apparatus C has just finished showing its pictures and apparatus A is still rewinding its film 5 onto spool 3, going to apparatus A we find at commutator 55 that circuit $C^3$ to the motor 16 is closed and circuit $C^{13}$ through solenoid 164 of apparatus C is open at commutator 55. As apparatus C has operated to cut off its light and motor by advancing the ratchet wheel 156 one notch through the operation of rocker arm 154, as hereinbefore described, the rocker arm 154 has also lifted pin 160 to engage hooked end 161 with projecting lip 162, closing one break in circuit $C^{13}$, but since circuit $C^{13}$ between solenoid 164 of apparatus C and commutator 55 of apparatus A is still open at commutator 55, solenoid 164 cannot operate; hence apparatus C has stopped, but the hooked pin 161 is left suspended on 162. When apparatus A finishes rewinding its film 5 onto spool 3 its motor circuit C³ is opened by advancing of commutator 55, as above described, and at the same time the circuit C¹³ is closed at commutator 55. Since hooked pin 161 and projecting lip 162 of apparatus C were left in contact by the stopping of apparatus C, the circuit C¹³ is now entirely complete to solenoid 164 of apparatus C, allowing it to operate as hereinbefore described and send an electrical impulse to operate solenoid 56 of apparatus A which advances the ratchet wheel 26 one notch, opening circuit C¹³ at commutator 55 to solenoid 164 of apparatus C and closing circuit C³ at commutator 55 to motor 16 of apparatus A, starting apparatus A on its way again through the same operation of showing its pictures, rewinding its film and stopping. This automatic feature whereby one machine cannot be started by another machine until it is in complete readiness is also applicable between apparatuses A and B, and B and C, as well as between C and A just described, their respective commutators and solenoids having exactly the same functions, relations and connections as those of apparatuses C and A. Thus it will be seen that my invention is absolutely automatic in that none of the picture-projecting machines can be started until it has completely finished showing its pictures, at the completion of which it puts itself in readiness to be re-started by the closing at one point of a circuit, controlled at another point by another machine.

Attention is also called to the fact that each one of my picture-projecting machines is itself automatic, and could be connected up for repeated automatic operation independently of any other machine.

While I have shown and described one practical embodiment of my invention, I am aware that many changes can be made therein without departing from the spirit thereof and I do not, therefore, limit my invention to the embodiment thereof, here shown for purposes of illustration, except as I may be limited by the hereto appended claims.

I claim:

1. An automatic picture-projecting apparatus comprising in combination a plurality of electrically-operated moving picture machines, an electrically-operated, automatic, lantern slide picture-projecting machine, electrical interconnections between said machines for successively and automatically starting and operating the same, said electrical interconnections being automatically controlled by said machines.

2. In combination, an electrically operated moving picture machine, an electrically operated, automatic, lantern slide picture projecting machine, electrical interconnections between said machines for successively and automatically starting and operating the same, said electrical interconnections being automatically controlled by said machines.

3. In combination, an electrically operated moving picture machine, means electrically operated for reversing and rewinding the film thereof, an electrically operated, automatic, lantern slide picture projecting machine, means for automatically shifting the slides after they are shown to a self feeding position, electrical interconnections between said moving picture machine and said lantern slide picture machine for successively and automatically starting and operating the same, said connections being automatically controlled by said machines.

4. In combination, an electrically operated moving picture machine, means for reversing the direction of the film, said means being controlled by the film reel at a time when the film is practically removed therefrom, an electrically operated lantern slide picture projecting machine, means for automatically shifting the slides through a circuitous path of travel for use, and electrical interconnections between said machines for automatically and successively starting and operating the same, substantially as described.

5. In combination a moving picture machine, means for automatically operating the reels thereof in either direction for running a film from one to the other, means controlled by said reels for automatically reversing the direction of said reels, a lantern slide projecting machine, lantern slides therefor, means for automatically moving said slides successively and continuously to an exposed position while said machine is operating, and electrical interconnections between said moving picture machine and said lantern slide machine for successively and automatically starting said machines, substantially as shown and described.

6. In combination, a plurality of electrically operated moving picture machines, means electrically operated for reversing and rewinding the films thereof, electrical interconnections between said machines for successively and automatically starting and operating the same, said electrical interconnections being automatically controlled by said machines.

7. In combination, two complete, electrically operated moving picture machines, electrical interconnections between said machines for successively and automatically starting and operating the same, said mechanism being adapted to automatically cut off the light and rewind the film of one machine, during the functioning operation of the other, and means whereby the change is automatically controlled by said machines during their operation.

8. In combination, a complete, electrically operated moving picture machine, means for automatically reversing the direction of the film reels at the limits of the film, whereby to rewind said film, said means being controlled by said reels, a lantern slide picture projecting machine, means for automatically and successively showing slides therein, and interconnections for electrically and automatically and successively starting said machines, whereby to automatically and successively keep said machines operating continuously.

Signed at Portland, Multnomah county, Oregon, this 4th day of December, 1916.

ALMONT A. BAILEY, Jr.

In presence of—
I. M. Griffin,
F. G. Lenny.